Nov. 2, 1937.  L. O. REICHELT  2,097,501
ELECTRICAL CABLE AND A METHOD OF MAKING THE SAME
Filed July 12, 1933   6 Sheets—Sheet 3
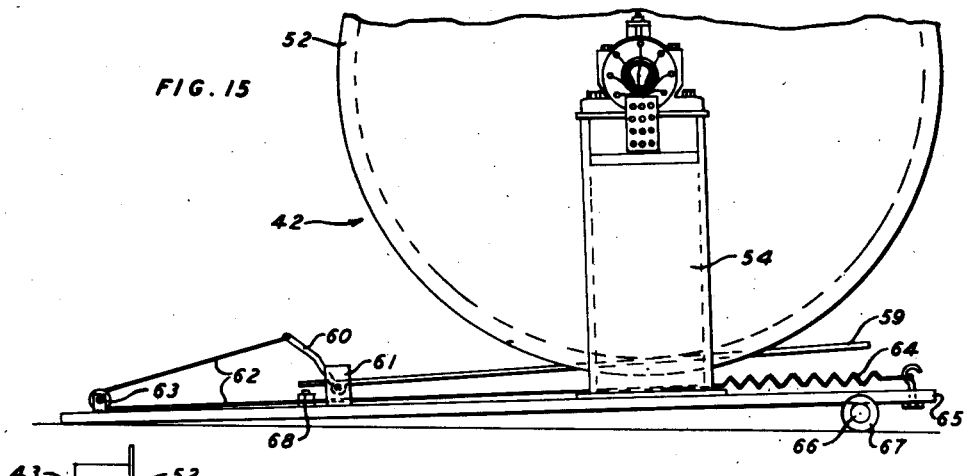
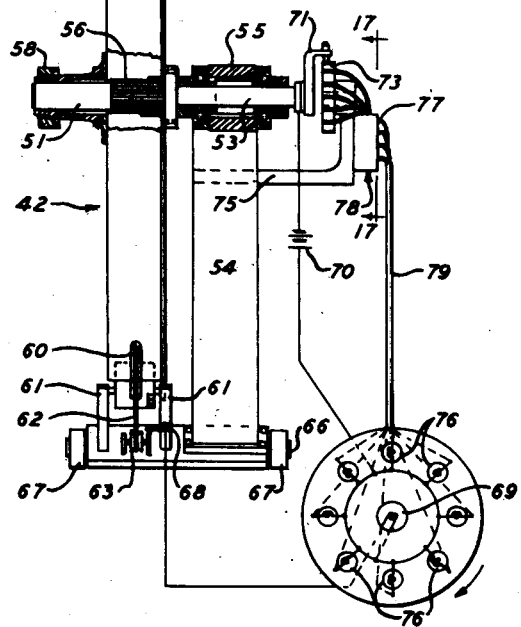
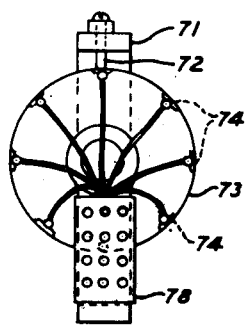
INVENTOR
L. O. REICHELT
BY
E. R. Nowlan
ATTORNEY Nov. 2, 1937.　　　　L. O. REICHELT　　　　2,097,501
ELECTRICAL CABLE AND A METHOD OF MAKING THE SAME
Filed July 12, 1933　　　6 Sheets-Sheet 4
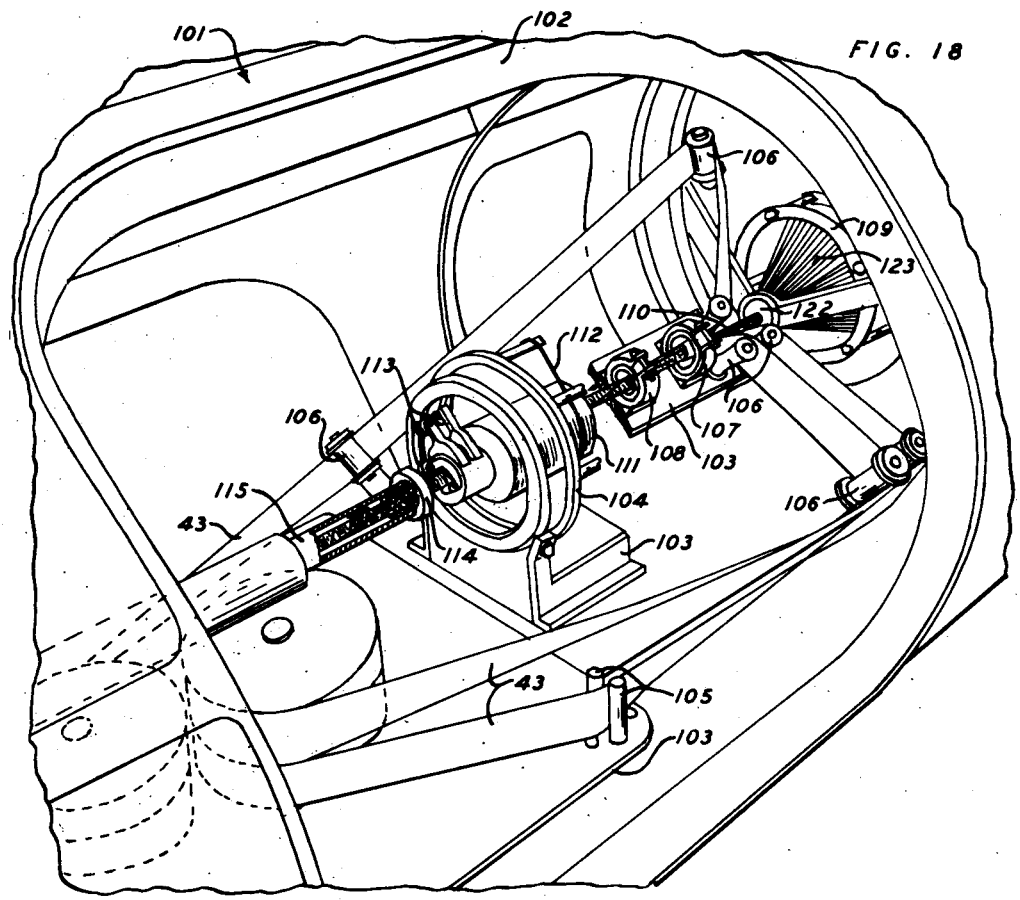
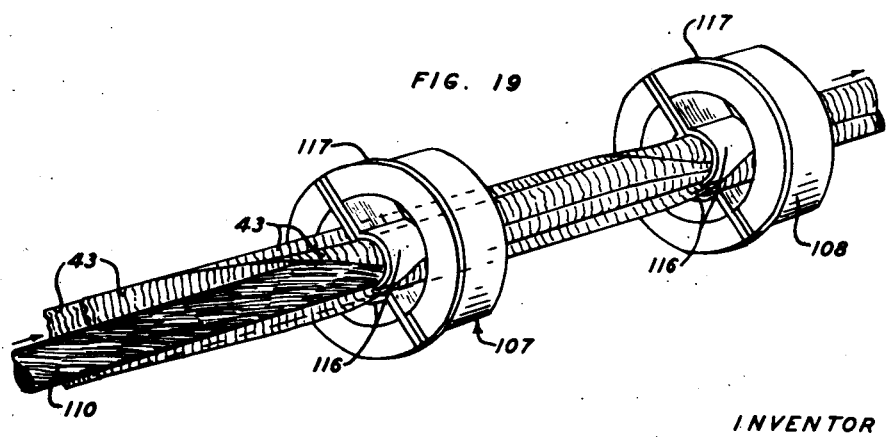
INVENTOR
L. O. REICHELT
BY
E. R. Nowlan
ATTORNEY Nov. 2, 1937.  L. O. REICHELT  2,097,501
ELECTRICAL CABLE AND A METHOD OF MAKING THE SAME Filed July 12, 1933   6 Sheets-Sheet 5

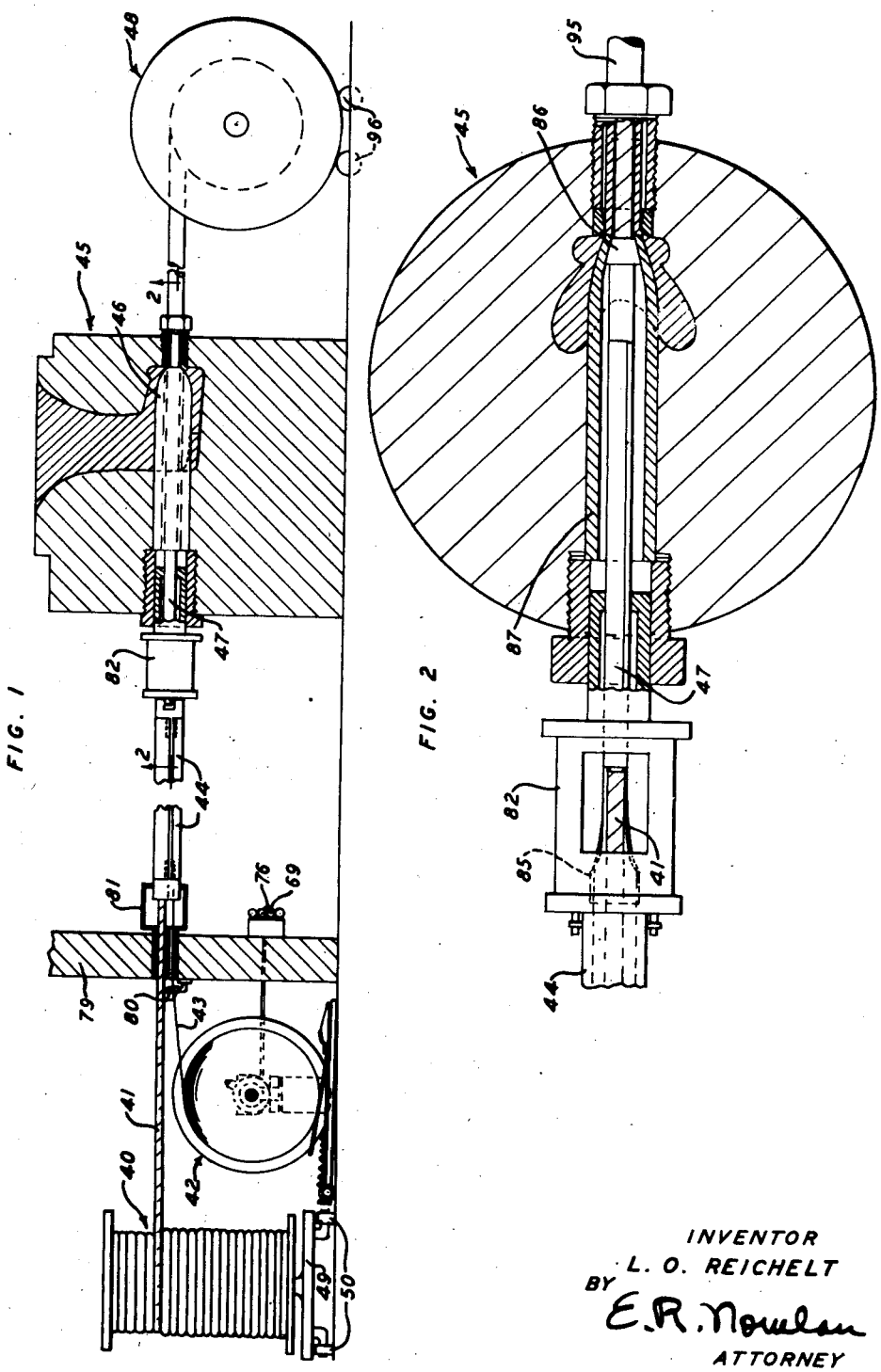

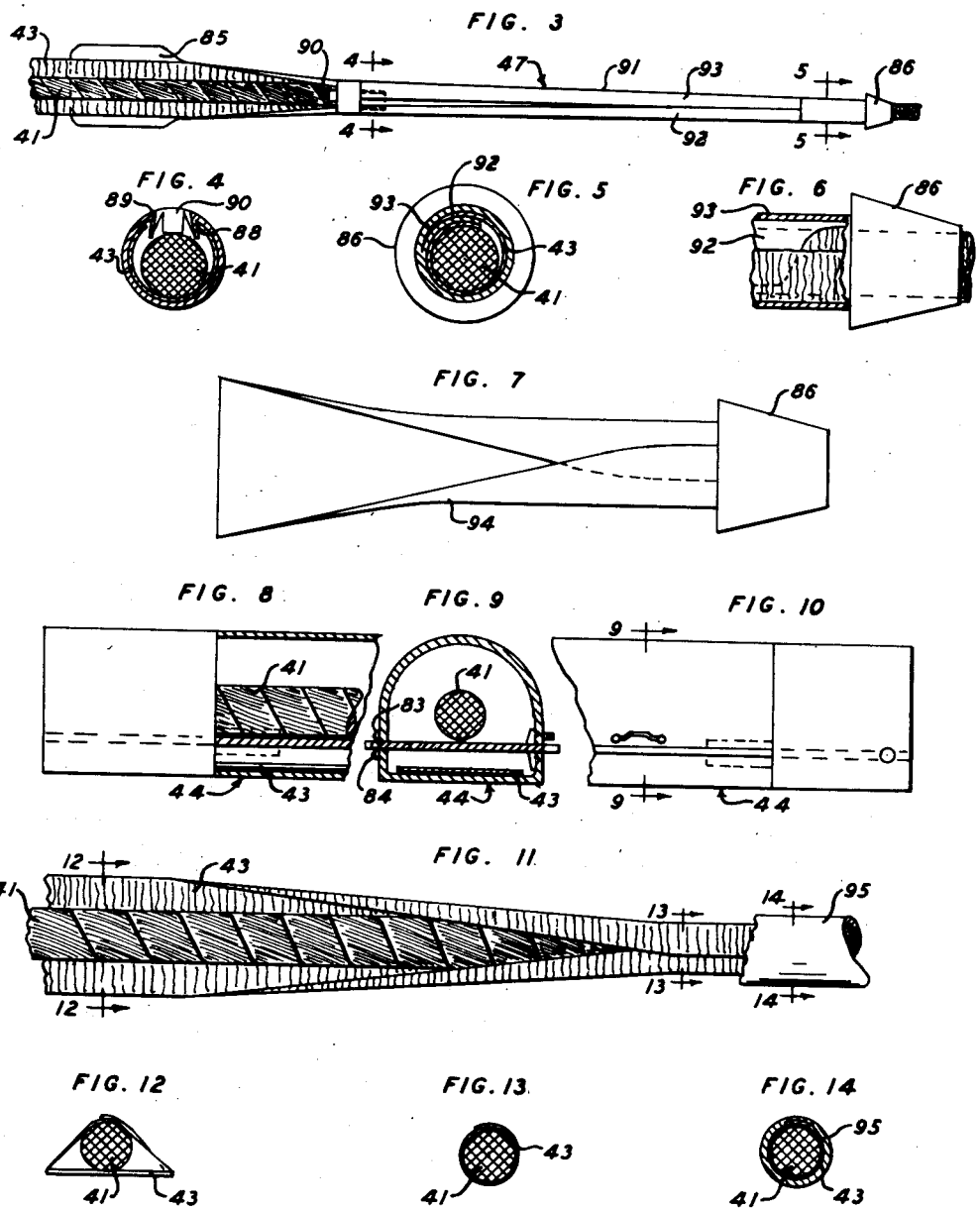

INVENTOR
L. O. REICHELT
BY
E. R. Nowlan
ATTORNEY

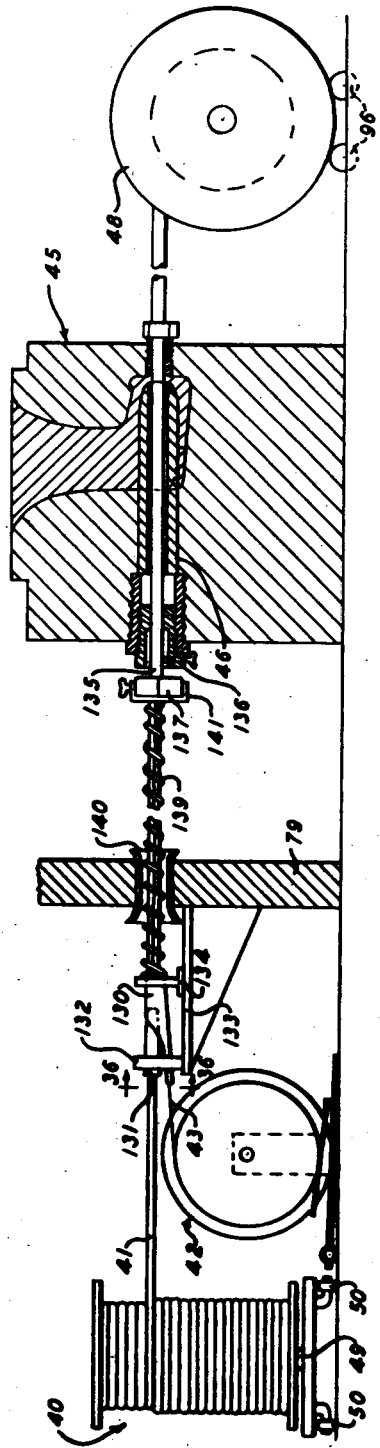

Patented Nov. 2, 1937

2,097,501

UNITED STATES PATENT OFFICE 2,097,501

ELECTRICAL CABLE AND A METHOD OF MAKING THE SAME

Lester O. Reichelt, Cranford, N. J., assignor to Western Electric Company, Incorporated, New York, N. Y., a corporation of New York Application July 12, 1933, Serial No. 680,037

6 Claims. (Cl. 173—264)

The invention relates to electrical cables and a method of and apparatus for making the same, and more particularly to multi-conductor cables of the type employed for the transmission of intelligence electrically.

Objects of the present invention are to improve the construction and provide an improved method and improved apparatus for constructing the cable.

In accordance with a preferred embodiment of the invention there is applied over a cable core having a strand binding, a crinkled or crepe paper covering freely expansible in a longitudinal direction, and self adaptable to helical formations of the cable core. The paper covering comprises one or more strips of crepe paper applied longitudinally with the cable core and wrapped transversely around the cable core by means of one or more dies so that the paper covering completely encircles the cable core, and in the case of cables having a metal sheath extruded or otherwise formed over the paper covered core, the crinkled paper forms a cushioning pad between the conductors and the sheath effective to protect the conductors from wrinkles on the inner surface of the metal sheath formed when the cable is bent.

In two preferred embodiments herein shown and described the paper is applied over the cable core just prior to the application of a metallic sheath and in another preferred embodiment the paper is applied at the same time that the stranding of the insulating conductors into a core takes place. In this embodiment the paper strips are longitudinally spiralled around the core due to the twisting of the core in the stranding operation and a strand binding is applied thereover to cause the paper to completely encircle the core and to retain the paper on the core.

The invention will be better understood from the following detailed description and accompanying drawings, in which Fig. 1 is a view, partially in section, of one embodiment of the invention;

Fig. 2 is an enlarged view, partially in section, of a portion of the apparatus shown in Fig. 1, taken along the line 2—2 of Fig. 1;

Fig. 3 is a plan view of a paper forming die;

Fig. 4 is a section along the line 4—4 of Fig. 3;

Fig. 5 is a section along the line 5—5 of Fig. 3;

Fig. 6 is an enlarged view, partially in section, of one end of the paper forming die shown in Fig. 3;

Fig. 7 is another type of paper forming die;

Fig. 8 is an enlarged view, partially in section of one end of the moisture proof tube shown in Fig. 1 for conveying the cable and paper to the paper forming die;

Fig. 9 is a cross-section of the end of the moisture proof tube shown in Fig. 10;

Fig. 10 is an enlarged view of the other end of the moisture proof tube shown in Figs. 1 and 8;

Fig. 11 is a view of a cable showing the method of application of the paper longitudinally over the cable core;

Figure 26:
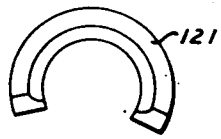
Figure 27:
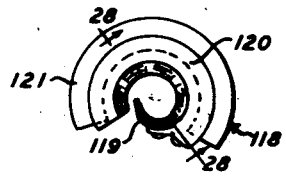
Figure 28:
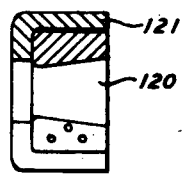
Figure 29:
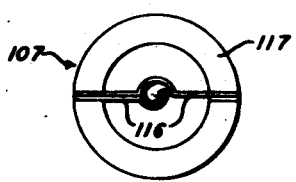
Figure 30:
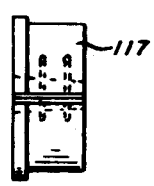
Figure 31:
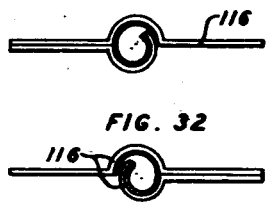
Figure 32:
Figure 33:
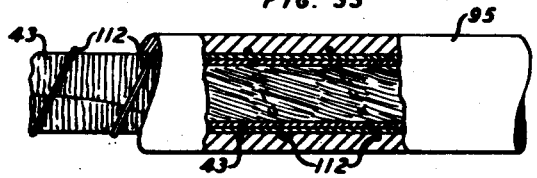

Figs. 12, 13, and 14 are sectional views of the cable taken along the lines 12—12, 13—13, and 14—14, respectively, of Fig. 11;

Fig. 15 is an enlarged elevational view of the paper supply unit shown in Fig. 1;

Fig. 16 is an end view, partially in section, of the paper supply unit shown in Fig. 15;

Fig. 17 is an enlarged view of the commutator shown in Fig. 16, taken along the line 17—17 of Fig. 16;

Fig. 18 is a perspective view, partially in section, of a flier strander showing another embodiment of the invention;

Fig. 19 is an enlarged perspective view of a portion of the apparatus shown in Fig. 18 for forming the paper over the cable core;

Figs. 20 to 25, inclusive, show methods of applying one or more layers of paper over the cable core by means of the apparatus shown in Figs. 18 and 19;

Fig. 26 is a view of a portion of the forming die shown in Fig. 27;

Fig. 27 is a view of a paper forming die;

Fig. 28 is a sectional view taken along the line 28—28 of Fig. 27;

Figs. 29 to 31, inclusive, are views of another embodiment of the paper forming die for forming a lap in one direction;

Fig. 32 is a view of a portion of the die similar to that shown in Figs. 29 to 31, inclusive, for forming a lap in the opposite direction;

Fig. 33 is a section of a lead covered cable, partially in cross-section, having longitudinally applied paper covering and a cotton strand binding over the paper;

Fig. 34 is a view partially in section, of another embodiment of the invention;

Fig. 35 is an enlarged view of means for applying a strip of paper over a cable core just prior to its entrance into an extrusion press;

Fig. 36 is a sectional view taken along the line 36—36 of Fig. 34;

Fig. 37 is a sectional view showing an auxiliary paper forming means and taken along the line 37—37 of Fig. 35, and Fig. 38 is a perspective view of a removable segment of a cable core guide shown in Fig. 34.

Referring to the drawings in which similar parts are indicated by identical reference numerals, a preferred embodiment of the invention (Fig. 1) comprises a rotatable core truck 40 having a supply of cotton bound cable core 41 thereon, a paper supply unit 42 having a supply of crinkled or crepe paper 43 thereon, a moisture proof tube 44 through which the cable core 41 and the paper 43 pass, a metal extrusion press 45 having a core tube 46 with a paper forming die 47 therein, and a take-up reel 48. The core truck 40 and the paper supply unit 42 are located in a low humidity storage oven. The core truck 40 has a base 49 and is mounted on wheels 50. The paper supply unit 42 (Figs. 1, and 15 to 17, inclusive) comprises a main supply arbor 51 to which a metal disc 52 is secured, and having an extended shaft portion 53. The shaft portion 53 is supported by a channel member and a ball bearing pillow block 55. The paper 43 is secured to the supply arbor 51 by means of a knurled portion 56 and a clamp nut 58. A tension arm 60 is rotatably secured in a pair of lever pivot arm supports 61. A tension paddle brake and limit indicating lever 59 is secured to the arm 60. A steel cable or rope 62, one end of which is connected to the tension arm 60 passes around a pulley 63, the other end of the cable 62 is connected to one end of a paddle tension spring 64. The tension spring 64 tends to move the paddle brake and limit indicating lever 59 upward. It provides a definite tension on the paper 43 as it is unreeled, and also, as described below, operates an indicator to show when the paper is about exhausted.

The channel member 54 is welded or otherwise suitably secured to a metal base 65. An axle 66 having a pair of wheels 67 is secured to one end of the metal base 65. A switch 68, arranged to be operated by the tension arm 60, is connected in series with a pad limit lamp 69 and a source of potential 70. The switch is adjusted to close and light the pad limit lamp 69 when the paddle brake and limit indicating lever 59 reaches a predetermined height. A brush holder 71 and a brush 72 are secured to the shaft portion 53 and arranged to rotate with the shaft portion 53. A commutator 73 having a plurality of contacts 74 is secured by means of a commutator holder 75 to the channel supporting member 54. One side of each of a plurality of pad rotation indicating lamps 76 are connected by means of conductors 79 through a plug 77 and a jack-box 78, to the contacts 74 of the commutator 73. The brush 72 is connected through the source of potential 70 to the other sides of the lamps 76. The lamps 69 and 76 are located on the outer wall 79 of the low humidity storage oven as shown in Fig. 1 and enable the operator of the extrusion press 45 to determine whether the paper supply unit 42 is functioning properly and also when the supply of paper 43 is becoming low. Paper tensioning fingers 80, through which the paper 43 passes, are secured to the inner side of the wall 79.

The rear end of the moisture proof tube 44 (Figs. 1, 8, 9, and 10) is slidably mounted in a holder 81 inserted in an opening of the wall 79. The front end of the moisture proof tube 44 is pivotally secured in a holder 82 attached to the extrusion press 45. As shown in Figs. 8 to 10, inclusive, the moisture proof tube 44 has an upper compartment or passageway for the cable core 41, and a lower passageway for the paper 43. The forward end of the moisture proof tube 44 (Figs. 9 and 10) is provided with hinges 83 and 84 so that the upper and lower compartments at the forward end can be opened to facilitate the insertion of the cable core 41 and the paper 43 through the paper forming die 47.

The paper forming die 47 (Figs. 1 to 6, inclusive) is held in position at the rear end thereof by the holder 82 which has a flat surface to engage with the flat portion 85 of the die 47, and is held in position on the front end thereof by the conical nose 86 which engages a corresponding inner surface at the forward end of the core tube 87. As the paper 43 and the cable core 41 pass through the die 47, the paper 43 is first formed into a U-shape by means of the lips 88 and 89 (Fig. 4) and the cable core 41 is pressed downward against the paper 43 by means of a projection 90. The neck 91 of the die 47 is formed with a lower fin-like portion 92 and an upper fin-like portion 93, and gradually tapers to the conical nose 86. As the paper 43 passes through the neck 91 of the die 47, one edge is beneath the lower fin-like portion 92 and the other edge between the upper fin-like portion 93 and lower fin-like portion 92, as shown in Fig. 5. As the cable core 41 and paper 43 emerge from the nose 86 of the die 47, the paper is wrapped around the cable core as shown in Fig. 13. The die 94 shown in Fig. 7 is similar to, though simpler in design than, the die 47 shown in Fig. 3, and may be used in some cases. The paper covered cable core passes out of the core tube 87 and a sheath of lead 95 is extruded thereover by the extrusion press 45, which may be of any suitable type well known in the art. The cable is propelled through the apparatus by the lead extrusion press and wound on the take-up reel 48, which is rotated by any suitable means, such, for example, as the rotating floor rollers 96 (Fig. 1).

In another preferred embodiment of the invention, as shown in Figs. 18 to 33, inclusive, the paper is applied over the insulated conductors as they are formed into a cable core. The flier strander 101 shown in Fig. 18 is shown and described in greater detail in U. S. Patent 1,813,917 granted to me July 7, 1931. The flier 102 is arranged to rotate. The base 103 is arranged to be held stationary within the rotating flier 102 by means of suitable planetary gearing (not shown). Mounted on the base 103 are several rolls of crepe paper 43, a strand serving head 104, guide fingers 105, which may serve, if necessary, to apply a tension to the paper 43, guide pulleys 106, a first paper forming die 107 and a second paper forming die 108. The forming dies 107 and 108 are located between a sizing die 122 which forms the individual insulated conductors 123 into a cable core 110, and the serving head 104. The conductors 123 are propelled from the stranger supplies (not shown) through a positioned face plate 109 into the sizing die 122, forming dies 107 and 108, strand serving head 104, sizing die 114, and then through the rest of the machine (not shown). The crepe paper 43 is fed from the supply rolls through the guide fingers 105, around the guide pulleys 106 and through the forming dies 107 and 108. The forming dies 107 and 108, through which the cable core 110 is also propelled, form the layers of paper around the cable core.

The serving head 104 has a cop 111 of cotton strand 112 mounted therein, and guide pulleys 113 associated therewith. This arrangement applies a strand 112 around the paper covered cable core between the serving head 104 and the sizing die 114. The die 114 is mounted in a sizing die holder 115 which rotates at the same speed as the flier 102 and the cable. As the cable core 110 and the paper strips 43 have a twist applied thereto between the face plate 109 and the sizing die 114, the layers of paper 43 are longitudinally spiralled around the cable core.

The forming dies 107 and 108 (Figs. 18, 19 and 29 to 31, inclusive) have a pair of forming lips 116 and a supporting ring 117. As shown in Fig. 31, the forming lips 116 are conical in shape to gradually reduce the diameter of and to easily form the paper covering 43. They are arranged so that when desired one layer of paper can pass around the outside of the forming lips 116, while another layer of paper passes inside the forming lips and is being formed around the cable core. In Fig. 18 there are shown three layers of paper 43 being applied around the cable core, the two lower strips being led through the interior of the forming lips 116 of the first and second forming dies 107 and 108, and the upper strip being fed through the space between the forming lips 116 and supporting ring 117 of the first forming die 107 and through the interior of the forming lips 116 of the second die 108, and formed around the cable. When desired additional layers of paper may be applied or only one or two layers can be applied. It is also possible by the use of the die shown in Fig. 31, with that shown in Fig. 32, to apply two layers of paper from the same side and at the same time give them different directions of lap.

Figure 20:
Figure 21:
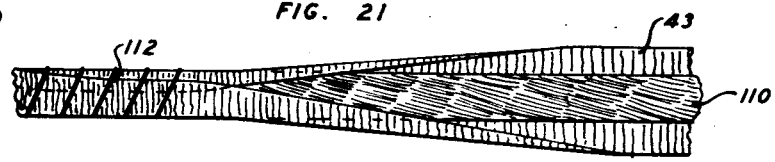
Figure 22:
Figure 23:
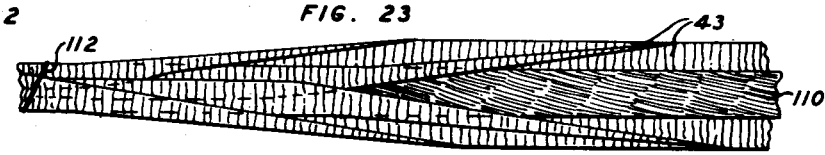
Figure 24:
Figure 25:

In Fig. 19 are shown two layers of paper 43 being applied through dies 117 over the cable core 110 from one side of the cable. This results in two layers of paper with the lap in the outer layer over the top of the lap in the inner layer. The two layers of paper could be applied from opposite sides of the cable core (as shown in Fig. 25) with the laps in the paper 43 on the opposite sides of the cable core. In Figs. 20 to 25, inclusive, there are shown layers of paper and strand serving being formed over the cable core 110, the paper forming dies and strand serving apparatus having been omitted from the drawings to simplify the disclosure. In the embodiment shown in Figs. 20 and 21, a single layer of paper 43 is being applied over the cable core 110, and is bound by the strand 112. In the embodiment shown in Figs. 22 and 23, two layers of paper 43 are being applied from the same side of the cable core, the inner layer of paper being formed around the cable core 110, and the outer layer being formed over the first layer. In the embodiment shown in Figs. 24 and 25, two layers of paper 43 are being applied from different sides of the cable core 110, the inner layer being first formed around the cable core 110, and the outer layer over the first layer.

The paper forming dies 107 and 108 are preferably formed with the supporting ring 117 in two halves (Figs. 29 and 30) to facilitate in the construction thereof and so that the forming lips 116 may be readily changed for cables of different sizes, and to firmly hold the forming lips in the desired position.

Another type of paper forming die 118 found satisfactory (Fig. 27) has a conical forming lip 119 secured to a segment 120 (Figs. 27 and 28). Both the segment 120 and conical forming lip 119 are tapered as shown to gradually reduce the diameter of and facilitate forming the paper around the cable core 110. When two layers of paper are to be applied through separate paper forming dies, an outer annular ring segment 121 (Figs. 26 and 27) is employed to allow the second wrapping of paper 43 to pass around the first forming die to the second forming die. In the embodiment shown the two laps of paper would be applied from opposite sides of the cable core.

In another preferred embodiment shown in Figs. 34 to 38, inclusive, the crepe paper 43 is applied over the cable core 41, in the low humidity storage room, by means of a paper forming die 130, which is similar to the forming die 94 (Fig. 7). A cable core guide tube 131 is employed to position the cable core 41 properly with reference to the die 130. The cable core guide tube 131 and one end of the paper forming die 130 are secured to a forming die and cable core guide tube support 132 which is slidably secured to a shelf 133. A second forming die support 134, also slidably secured to the shelf 133 is fastened to the other end of the paper forming die 130.

A cable core guide tube 135 extends into the core tube 46 of the extrusion press 45, to prevent the paper 43 from separating from the cable core 41, as they pass through the press. The cable core guide tube 135 is fastened to the extrusion press 45 by means of a nipple 136. A cable core guide 137 is secured to the guide tube 135. A cable core confining medium, which has been shown as a flexible spring 139, passes through a bell-mouth 140 in the wall 79, and is secured to the paper forming die 130 and to the cable core guide by means of a support 141. Other confining mediums such as flexible tubing may be used in place of the spring 139. The flexible spring 139 prevents the paper 43 from separating from the cable core 41 and at the same time provides a means for visual inspection of the condition of the paper over the cable core.

If the paper 43 has a defective portion it can be readily detected as it passes through the spring 139 and the defective portion can be repaired by converting the cable core guide 137 into an auxiliary die 142 (Figs. 35 and 37). This is accomplished by removing a segment 143 (Fig. 38) from the cable core guide 137 and inserting in its place a conical forming lip 144 (Fig. 37) and moving the spring support 141 away from the cable core guide 137, as shown in Fig. 35. A supply of calcium chloride 146 or other suitable material is preferably kept in the bottom of the box 145 to keep the paper 43 dry. The paper 43 is led from the box 145 over the roller 147 and through the auxiliary die 142, as shown in Figs. 35 and 37. The upper portion of the guide tube 135 adjacent the die 142 (Fig. 35) has an opening which conforms to the projection 149 on the segment 143. The paper 43 is fastened to the cable core at this point by means of a strand 148. The auxiliary supply may be disconnected as soon as the defective portion has been repaired, or may also be used as a permanent forming means when the main supply unit 42 is not functioning.

While the spring 139 has been shown connected to the cable core guide 137 by means of the spring support 141, the core guide 137, spring support 141, nipple 136 and guide tube 135 may be omitted, if desired, and the spring extended to the nose of the core tube 46, at which point the lead sheath is applied to the cable core. This form of construction would be employed only in cases where the auxiliary forming die shown in Fig. 35 is not required for repair purposes.

While several embodiments of the invention have been herein shown and described in detail, it is to be understood that the invention is generic in character and is not to be construed as limited to the particular embodiments shown, since numerous modifications thereof may be made by persons skilled in the art, without departing from the spirit of applicant's invention, the scope of which is to be determined by the appended claims.

What is claimed is:

1. The method of forming an electric cable, which comprises applying a strip of dried crinkled paper longitudinally of a dried group of insulated conductors, forming the paper transversely of and over the conductors, simultaneously twisting the paper and the conductors, binding the paper covered insulated conductors, and applying a protective covering over the strand bound paper covered conductors, each of these steps being carried on while excluding moisture.

2. The method of forming an electric cable, which comprises applying a strip of crinkled paper longitudinally of a group of insulated conductors, forming the paper transversely of and over the conductors, simultaneously twisting the paper and the conductors, and applying a protective covering of seamless metal over the strand bound paper covered conductors whereby the conductors are protected against wrinkles formed on the interior of the covering when the cable is bent.

3. The method of making an electric cable which comprises the steps of storing a group of insulated conductors in a drying chamber to remove moisture thereupon, storing a supply of crimped paper tape in a drying chamber to remove moisture thereupon, and combining the group of insulated conductors with the tape as a cover while withdrawing both from the chamber and while excluding access of moisture.

4. The method of making an electric cable which comprises the steps of storing a group of insulated conductors in a drying chamber to remove moisture thereupon, storing a supply of crinkled paper tape in a drying chamber to remove moisture thereupon, combining the group of insulated conductors with the tape as a cover while withdrawing both from the chamber and while excluding access of moisture, and extruding a seamless sheath of metal over the paper while continuing the exclusion of access of moisture.

5. The method of making an electric cable which comprises the steps of storing a group of insulated conductors in a drying chamber to remove moisture thereupon, storing a supply of crinkled paper tape in a drying chamber to remove moisture thereupon, withdrawing the conductors and the tape from the chamber, and immediately forming the tape into a cover over the conductors.

6. The method of making an electric cable which comprises the steps of storing a group of insulated conductors in a drying chamber to remove moisture thereupon, storing a supply of crinkled paper tape in a drying chamber to remove moisture thereupon, withdrawing the conductors and the tape from the chamber, immediately forming the tape into a cover over the conductors, and then immediately extruding a seamless sheath of metal over the paper.

LESTER O. REICHELT.